United States Patent
Lee et al.

(10) Patent No.: US 12,209,392 B2
(45) Date of Patent: Jan. 28, 2025

(54) WORK MACHINE

(71) Applicant: HITACHI CONSTRUCTION MACHINERY CO., LTD., Tokyo (JP)

(72) Inventors: Hyejeoung Lee, Ushiku (JP); Shinichi Kotake, Tsuchiura (JP); Shiho Izumi, Hitachinaka (JP); Shinji Ishihara, Hitachinaka (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 0 days.

(21) Appl. No.: 18/024,991

(22) PCT Filed: Feb. 7, 2022

(86) PCT No.: PCT/JP2022/004694
§ 371 (c)(1),
(2) Date: Mar. 7, 2023

(87) PCT Pub. No.: WO2022/209303
PCT Pub. Date: Oct. 6, 2022

(65) Prior Publication Data
US 2023/0374757 A1 Nov. 23, 2023

(30) Foreign Application Priority Data
Mar. 30, 2021 (JP) ................. 2021-058579

(51) Int. Cl.
*G01S 19/28* (2010.01)
*E02F 3/32* (2006.01)
(Continued)

(52) U.S. Cl.
CPC ............ *E02F 9/264* (2013.01); *E02F 3/32* (2013.01); *G01S 19/14* (2013.01); *G01S 19/28* (2013.01)

(58) Field of Classification Search
CPC ................................................. E02F 9/264
See application file for complete search history.

(56) References Cited

U.S. PATENT DOCUMENTS

| 5,323,163 A | * | 6/1994 | Maki | ........................ G01S 19/28 342/357.48 |
| 6,094,625 A | * | 7/2000 | Ralston | ................... G01C 15/00 239/161 |

(Continued)

FOREIGN PATENT DOCUMENTS

| CN | 101571581 A | * | 11/2009 |
| CN | 101846734 A | * | 9/2010 |

(Continued)

OTHER PUBLICATIONS

International Preliminary Report on Patentability received in corresponding International Application No. PCT/JP2022/004694 dated Oct. 12, 2023.

(Continued)

*Primary Examiner* — Shelley Chen
(74) *Attorney, Agent, or Firm* — MATTINGLY & MALUR, PC

(57) ABSTRACT

A controller provided to a work machine stores a plurality of mask ranges which are used to select positioning satellites to be used by a receiver to compute a position of an antenna and are set with reference to an antenna on the basis of the postures of a work device and an swing structure. The controller computes each of a plurality of positioning precisions on the basis of satellite related data on the positioning satellites each of which is selected through use of each of the plurality of mask ranges and satellite related data on the positioning satellites which are selected through use of none of the plurality of mask ranges. The receiver computes the position of the antenna on the basis of satellite signals of (Continued)

the positioning satellites selected in a case of having the highest positioning precision out of the plurality of computed positioning precisions.

9 Claims, 8 Drawing Sheets

(51) Int. Cl.
   *E02F 9/26* (2006.01)
   *G01S 19/14* (2010.01)

(56) References Cited

U.S. PATENT DOCUMENTS

| | | | |
|---|---|---|---|
| 7,541,975 B2* | 6/2009 | Sever | G01S 19/28 342/357.48 |
| 9,116,231 B2* | 8/2015 | Vollath | G01S 19/23 |
| 2003/0014212 A1* | 1/2003 | Ralston | H04N 13/366 348/E13.059 |
| 2006/0022868 A1* | 2/2006 | Awata | G01S 19/52 342/357.35 |
| 2012/0229332 A1* | 9/2012 | Vollath | G01S 19/23 342/357.25 |
| 2013/0088389 A1 | 4/2013 | Yamada | |
| 2022/0025615 A1 | 1/2022 | Kanari et al. | |
| 2022/0220695 A1* | 7/2022 | Izumi | E02F 3/435 |
| 2022/0222392 A1 | 7/2022 | Ishihara et al. | |

FOREIGN PATENT DOCUMENTS

| | | | | |
|---|---|---|---|---|
| CN | 101571581 B | * | 10/2011 | |
| CN | 104181572 B | * | 1/2017 | ........... G01C 21/165 |
| CN | 106908818 A | * | 6/2017 | ........... G01S 19/423 |
| CN | 108196273 A | * | 6/2018 | |
| CN | 111856531 A | * | 10/2020 | ............. G01D 21/02 |
| CN | 111964677 A | * | 11/2020 | ........... G01C 21/165 |
| CN | 112288650 A | * | 1/2021 | ........... G06K 9/0063 |
| CN | 112346086 A | * | 2/2021 | ............. G01S 19/20 |
| JP | 2004-184121 A | | 7/2004 | |
| JP | 2013-083480 A | | 5/2013 | |
| JP | 2020-008286 A | | 1/2020 | |
| JP | 2020-139933 A | | 9/2020 | |
| JP | 2020-144014 A | | 9/2020 | |
| JP | 2020-200597 A | | 12/2020 | |
| JP | 2021060533 A1 | | 4/2021 | |
| JP | 2021-148467 A | | 9/2021 | |
| JP | 2021-195803 A | | 12/2021 | |
| KR | 102500969 B1 | * | 2/2023 | |

OTHER PUBLICATIONS

International Search Report of PCT/JP2022/004694 dated Mar. 8, 2022.

Korean Office Action received in corresponding Korean Application No. 10-2023-7007658 dated Aug. 21, 2024.

* cited by examiner

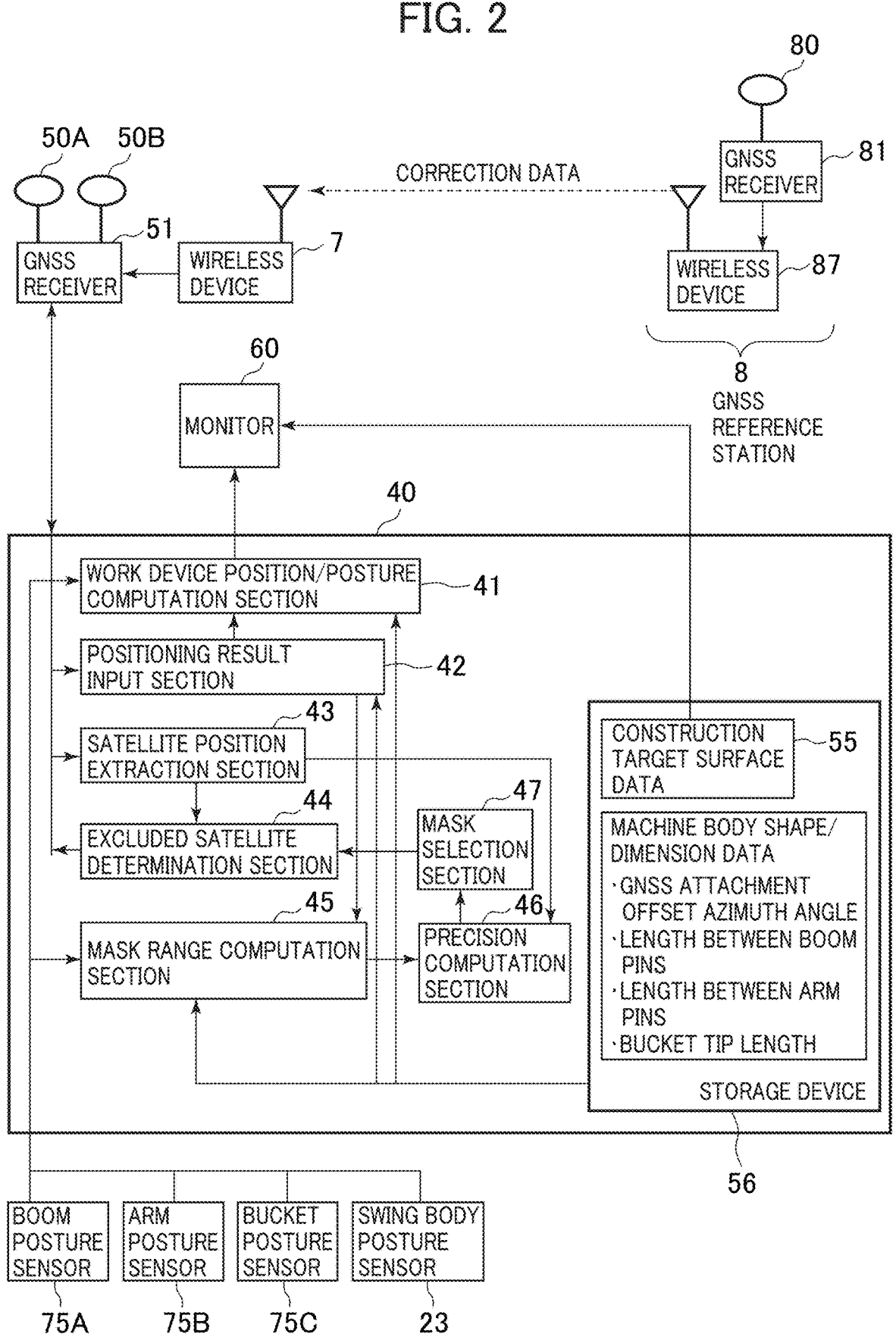

WORK MACHINE

TECHNICAL FIELD

The present invention relates to a work machine in which position sensing through use of a positioning satellite system is carried out.

BACKGROUND ART

In recent years, computerized construction has increasingly been introduced in construction sites. The computerized construction is a system that achieves higher efficiency in construction by utilization of electronic data and ICT (Information and Communication Technology: information communication technology) with focus placed on construction among a series of construction processes including survey, design, construction, inspection, management, and the like. As machines adapted to the computerized construction, there are known work machines typified by a hydraulic excavator, and, in the work machine, there are implemented a guidance function of displaying, on a monitor, a position of a machine body and a position and a posture of a front work device (sometimes also referred to as a work device) together with position data on a construction target surface and a machine control function of controlling the front work device such that a bucket does not excessively excavate the construction target surface. Such a work machine adapted to the computerized construction provides a function of presenting, to an operator, information on the basis of computerized construction data having three-dimensional coordinate data, to thereby assist work and an operation. For example, in machine guidance for the hydraulic excavator, a position of a bucket tip is computed from data on a position and a posture of a machine body and data on a posture of a front work device, and a position of the bucket with respect to the construction target surface is presented to the operator via the monitor.

To the hydraulic excavator of this type, in order to compute a position of an upper swing structure (a machine body) in a global coordinate system (a geographic coordinate system), there is sometimes mounted a satellite positioning system (for example, a GNSS (Global Navigation Satellite System: global positioning satellite system)) that receives positioning signals from positioning satellites via a positioning antenna attached to the upper swing structure and thereby computes a position of the upper swing structure. However, in the hydraulic excavator, front members such as a boom, an arm, and a bucket may be present above the positioning antenna for the satellite positioning system, and hence may sometimes interfere with reception of the positioning signals on straight routes. In this case, the positioning antenna is highly likely to receive the positioning signals as diffracted waves or reflected waves called multipath. When the received diffracted waves or reflected waves are used for positioning computation, there increases such a possibility that the positioning result includes an error.

As a technology which seeks to reduce the influence of the multipath, there is a technology disclosed in, for example, Patent Document 1. In Patent Document 1, there is disclosed a control device for a GPS receiver, and the control device stores, for each predetermined region, in a database, a mask range (mask information) representing a selection rule of GPS satellites that is defined on the basis of an arrangement of radio wave obstacles around the GPS receiver, acquires, from the database, the mask range corresponding to a region in which the GPS signals are received, and selects GPS satellites to be used for the positioning from GPS satellites which are among the plurality of GPS satellites navigating in the sky but are present outside the mask range.

PRIOR ART DOCUMENT

Patent Document

Patent Document 1: JP-2004-184121-A

SUMMARY OF THE INVENTION

Problem to be Solved by the Invention

The technology described in Patent Document 1 assumes only stationary radio wave obstacles, and does not mention a mask range to be used at the time when a movable radio wave obstacle such as the front work device of the hydraulic excavator is present around the positioning antenna. That is, in order to increase the satellite positioning precision in the field of the work machine, it is important to set a mask range by taking into consideration a posture of the front work device, which is the movable radio wave obstacle.

When the mask range used for the satellite selection is changed (or varied) each time according to the change in the posture of the front work device, it may be considered that the decrease in the positioning precision can be suppressed. However, the story is not so simple. First, the work machine operates the front work device to carry out work, and hence a posture change of the front work device (for example, a boom raising and lowering operation) is frequently carried out. When the mask range is changed in association with the posture change, the satellites used for the positioning computation are frequently switched. As a result, the positioning precision conversely decreases when the mask range is changed. Moreover, when the mask range corresponding to the posture of the front work device is used in a case in which the number of satellites available for the positioning computation is extremely small, there occurs a time zone in which even these small number of satellites are not available for the positioning. Hence, the decrease in the positioning precision can conversely be suppressed when the mask range is not used.

In the work machine in which the posture of the front work device possibly constituting a radio wave obstacle frequently changes during the work as described above, there is a case in which the decrease in the positioning precision during the work cannot be suppressed by mere exclusion of, in the positioning computation, satellites present in an area in which the front work device is present.

Note that, the decrease in the positioning precision mainly caused by the satellite arrangement is described above, but a decrease in the positioning precision caused by, for example, the number of satellites and an SN ratio (a signal-to-noise ratio) of the satellite signals possibly occurs in addition to the example described above.

The present invention has been made in view of the circumstances described above, and an object of the present invention is to provide a work machine capable of suppressing a decrease in a satellite positioning precision caused by an operation of a work device.

Means for Solving the Problem

The present application includes a plurality of means for solving the problem described above. One example thereof is a work machine including a lower track structure, an upper swing structure that is mounted in a swingable manner on the lower track structure, a work device of an articulated type that is mounted to the upper swing structure, a plurality of posture sensors that sense postures of the work device and the upper swing structure, a positioning antenna that is mounted to the upper swing structure and receives satellite signals from a plurality of positioning satellites, a receiver that is configured to compute a position of the positioning antenna on the basis of the satellite signals received by the positioning antenna, and a controller that is configured to compute the posture of the work device and the posture of the upper swing structure on the basis of sensing signals of the plurality of posture sensors, in which the controller stores a plurality of mask ranges set with reference to the positioning antenna on the basis of the postures of the work device and the upper swing structure, in order to select the positioning satellites to be used by the receiver to compute the position of the positioning antenna, the controller is configured to compute, on the basis of satellite related data on the selected positioning satellites, a plurality of positioning precisions including each positioning precision at the time when each of the plurality of mask ranges is used to select the positioning satellites and a positioning precision at the time when none of the plurality of mask ranges are used to select the positioning satellites, and the receiver is configured to compute the position of the positioning antenna on the basis of the satellite signals of the selected positioning satellites selected in a case of having the highest positioning precision of the plurality of positioning precisions.

Advantages of the Invention

According to the present invention, even when the mask range reflecting the posture of the front work device changes as the front work device operates, the mask range having the highest positioning precision is selected. Consequently, the decrease in the positioning precision caused by the operation of the work device can be suppressed, and a precision of work by the work machine can be increased.

BRIEF DESCRIPTION OF THE DRAWINGS

FIG. 2 is a functional block diagram of an onboard controller 40 mounted to the hydraulic excavator 1 of FIG. 1.

MODE FOR CARRYING OUT THE INVENTION

Figure 1:
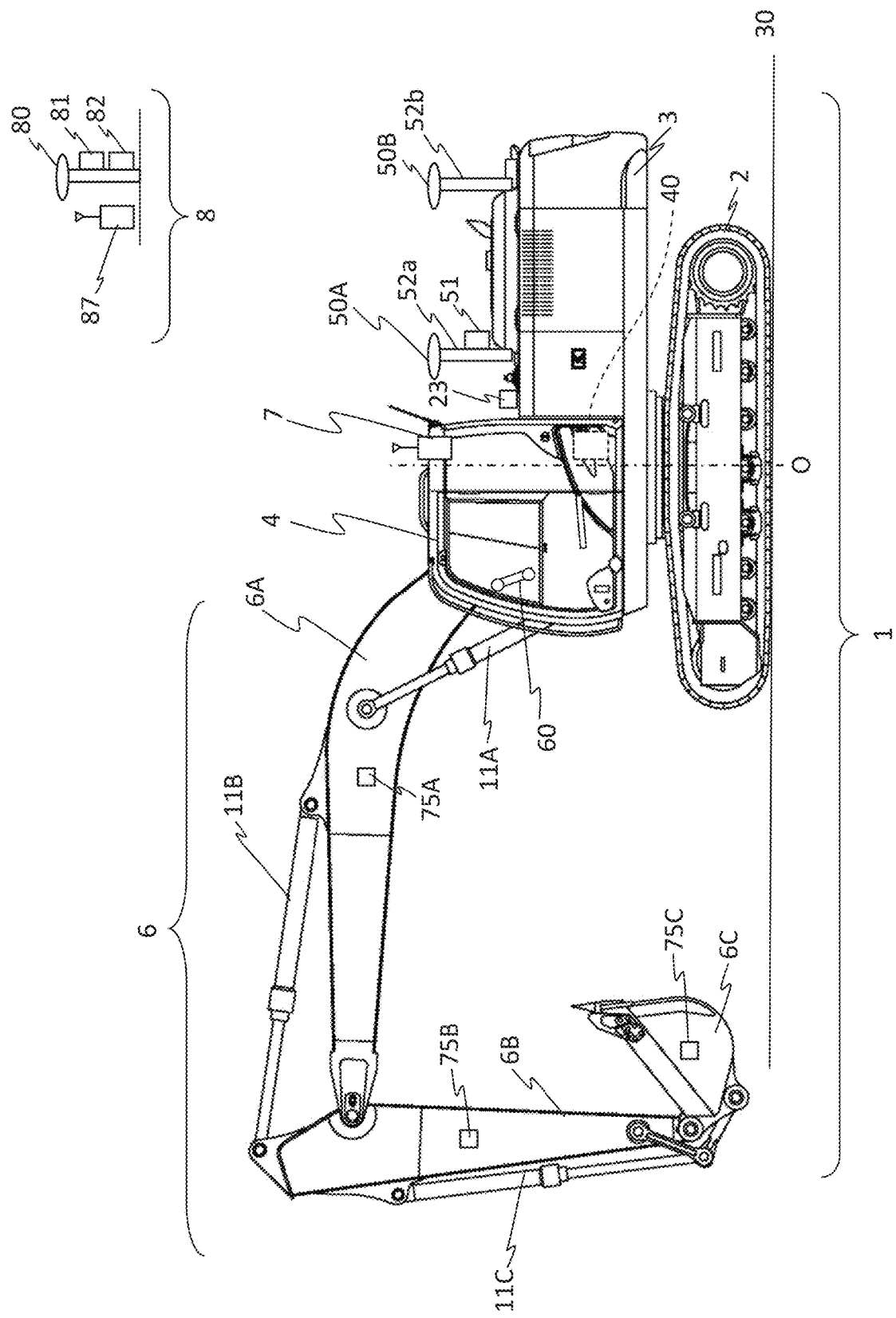
FIG. 1 is a side view of a hydraulic excavator 1 and a GNSS reference station 8 according to an embodiment of the present invention.

A description is now given of an embodiment of the present invention with reference to drawings. The embodiment described below is an application of the present invention to a hydraulic excavator of a crawler type serving as a work machine, and has a machine guidance function of displaying a positional relation between a bucket tip and a construction target surface on a monitor in a cab and a machine control function of restricting an operation of the work device (that is, an operation of the actuators for driving front members) such that the bucket tip does not exceed the construction target surface. It should be noted that, in the respective drawings, identical components are given the same reference characters, and repeated description will appropriately be omitted.

<Target Machine>

FIG. 1 is a side view of a hydraulic excavator 1 and a GNSS reference station 8 according to the embodiment of the present invention. The hydraulic excavator 1 illustrated in this view includes a track structure (a lower track structure) 2 of a crawler type, a swing structure (an upper swing structure) 3 attached to a top portion of the track structure 2 in such a manner as to be capable of swinging, and a front work device (sometimes simply referred to as a "work device") 6 formed of a link mechanism of an articulated type having one end (a base end) attached to a front portion of the swing structure 3. Reference character 30 in the view represents the ground.

The front work device 6 includes a boom 6A having one end coupled to the swing structure 3, an arm 6B having one end coupled to the other end of the boom 6A, and a bucket 6C having one end coupled to the other end of the arm 6B. Each of these front members 6A, 6B, and 6C is configured to rotate in an up-down direction.

Moreover, as actuators (hydraulic cylinders) which rotate the front members 6A, 6B, and 6C, a boom cylinder 11A, an arm cylinder 11B, and a bucket cylinder 11C are provided. The swing structure 3 can be driven to swing in the left-right direction about a swing center axis O by an unillustrated swing motor.

The boom 6A, the arm 6B, and the bucket 6C operate on a common plane, including the front work device 6, and this plane is hereinafter sometimes referred to as an operation plane. That is, the operation plane is a plane orthogonal to rotation shafts of the boom 6A, the arm 6B, and the bucket 6C, and can be set to, for example, centers in the width direction of the boom 6A, the arm 6B, and the bucket 6C (that is, the centers of the rotation shafts of the front members 6A, 6B, and 6C).

<Posture Sensors>

The hydraulic excavator 1 is provided with a plurality of posture sensors 75A, 75B, 75C, and 23 for sensing postures of the front work device 6 and the swing structure 3. In the present embodiment, for each posture sensor, there is used an inertial measurement device (IMU: Inertial Measurement Unit) which can sense an angle (or an angular velocity) and an acceleration. Of these posture sensors, the boom posture sensor 75A is attached to the boom 6A, the arm posture sensor 75B is attached to the arm 6B, and the bucket posture sensor 75C is attached to the bucket 6C (see FIG. 1). Moreover, the swing structure posture sensor 23 is attached to the swing structure 3 (see FIG. 1), and inclination angles (a pitch angle and a roll angle), a swing speed, and a swing angle of the swing structure 3 can consequently be measured. Output (sensing signals) of the posture sensors 75A, 75B, 75C, and 23 is input to the controller 40 via connection lines. It should be noted that, as the posture sensors for the front work device 6, angle sensors (for example, potentiometers or rotary encoders) for sensing the rotation angles of the respective front members may be used. Moreover, the bucket posture sensor 75c may be attached not to the bucket, but to a bucket link.

The swing structure 3 is provided with an operator's seat 4 for which a plurality of operation levers (not illustrated) operated by an operator and a monitor 60 on which the positional relation between the bucket 6C and the construction target surface and the like are displayed are installed, two GNSS antennas (positioning antennas) 50A and 50B which receive satellite signals from a plurality of positioning satellites (GNSS satellites), a wireless device 7 which receives GNSS correction data transmitted from a reference station 8, a GNSS receiver 51 which computes position coordinates of at least one GNSS antenna of the two GNSS antennas 50A and 50B in the geographic coordinate system (the global coordinate system) and an azimuth between the two GNSS antennas 50A and 50B (that is, an azimuth of the swing structure 3), and a controller 40 which is a computer for computing desired position coordinates on the front work device 6 on the basis of the position and the azimuth computed by the GNSS receiver 51 and the sensing signals of the plurality of the posture sensors 75A, 75B, 75C, and 23. Note that, in the present embodiment, there is employed such a configuration that the positions of the two GNSS antennas 50A and 50B and the azimuth angle of the swing structure 3 are computed by the one GNSS receiver, but there may be employed such a configuration that two GNSS receivers 51A and 51B corresponding to the two GNSS antennas 50A and 50B, respectively, are mounted.

<GNSS Reference Station>

A description is now given of the GNSS reference station 8 which wirelessly transmits the GNSS correction data to the wireless device 7 of the hydraulic excavator 1. The GNSS reference station 8 having a known coordinate position in the geographic coordinate system is provided with a GNSS antenna 80 which receives the satellite signals from a plurality of positioning satellites (GNSS satellites), a GNSS receiver 81 which computes position coordinates of the GNSS antenna 80 in the geographic coordinate system on the basis of the satellite signals (a code, a carrier, a satellite orbit, and a satellite signal reception level are included in the satellite signal) received by the GNSS antenna 80, a reference-station controller 82 which generates, on the basis of the plurality of satellite signals received by the GNSS antenna 80, the GNSS correction data to be wirelessly transmitted to the wireless device 7, and a wireless device 87 which transmits, to the wireless device 7, the GNSS correction data generated by the reference-station controller 82. The GNSS receiver 81 connected to the GNSS reference station antenna 80 wirelessly transmits the GNSS correction data from the wireless device 87 via the reference-station controller 82. When the GNSS correction data received by the wireless device 7 is used for the positioning in the GNSS receiver 51, highly-precise positioning at a centimeter level can be achieved.

<GNSS Antennas 50>

The two GNSS antennas 50A and 50B are fixed to the upper swing structure 3 via masts (antenna support members) 52a and 52b, respectively, are each positioned on an upper surface of the upper swing structure 3, and are arranged apart by a predetermined interval in a front-rear direction of the front work device 6.

The two masts 52a and 52b are support members each of which is in a pole shape, and which support the GNSS antennas 50A and 50B, respectively, above the upper swing structure 3. The two masts 52a and 52b in the present embodiment are arranged on the upper surface (a first area) of the upper swing structure 3 as the GNSS antennas 50A and 50B are arranged. A base end of each of the masts 52a and 52b is fixed to the upper surface of the upper swing structure 3, and each of the masts 52a and 52b extends substantially vertically from the base end. The GNSS antennas 50A and 50B each having an external shape in a substantially disc form having a center portion bulging in an axial direction are attached to distal ends of the masts 52a and 52b, respectively. The masts 52a and 52b support the antennas 50A and 50B, respectively, such that center axes thereof pass through center axes of the GNSS antennas 50A and 50B, respectively. Note that, the support members of the GNSS antennas 50A and 50B are not limited to the masts 52a and 52b each having the pole shape, and the GNSS antennas 50A and 50B can be supported by support members having various shapes.

<GNSS Receiver 50>

The GNSS receiver 51 computes the position coordinates of at least one GNSS antenna (for example, the GNSS antenna 50B) of the two GNSS antennas 50A and 50B in the geographic coordinate system (the global coordinate system) and the azimuth between the two GNSS antennas 50A and 50B (that is, the azimuth (also referred to as a heading) of the swing structure 3 and the front work device 6) on the basis of the plurality of satellite signals (including the codes of the satellites, the carriers, the satellite orbits, and the satellite signal reception levels) received by the two GNSS antennas 50A and 50B.

Electromagnetic waves (satellite signals) including transmission time information are being transmitted from the plurality of positioning satellites. The GNSS receiver 51 computes an arrival time difference from a reception time of the electromagnetic wave from each GNSS satellite and the transmission time included in this electromagnetic wave and estimates a distance between each GNSS satellite and each of the GNSS antennas 50A and 50B on the basis of the arrival time difference, to thereby compute the positions of the GNSS antennas 50A and 50B. The GNSS satellite is equipped with an elaborate clock, and the distance between each GNSS satellite and the GNSS antenna is computed by multiplying the arrival time difference obtained by demodulating the electromagnetic wave from each satellite by the speed of the electromagnetic wave.

The computed distance between each GNSS satellite and each GNSS antenna may contain an error. This error occurs due to such causes that a speed change in the electromagnetic wave generated by the ionospheres and vapor existing between the GNSS satellite and the GNSS antenna is different among the positions of the GNSS satellites different in azimuth and elevation angle, that the orbit information transmitted in the electromagnetic wave from each GNSS satellite is more or less different from the actual position, and that more or less errors are contained in the clock information among the GNSS satellites.

This error can be reduced by use of the RTK-GNSS (real time kinematic GNSS) which receives the GNSS correction data transmitted from the GNSS reference station 8 and carries out the positioning. For example, the positioning of the reference-station GNSS antenna 80 which is installed near (within some kilometers from) the hydraulic excavator 1 and has a known absolute position and the computation of the GNSS correction data are carried out by the reference-station GNSS receiver 81, and this correction data is transmitted by the wireless device 87 to the receiver 51 of the excavator 1. Then, the error can be reduced by measurement of not an absolute position, but a relative position (a vector) between the two GNSS antennas 50A (50B) and 80.

The correction data transmitted from the wireless device 87 of the GNSS reference station 8 is received by the wireless device 7 mounted to the hydraulic excavator 1 and is then transmitted to the GNSS receiver 51. The GNSS receiver 51 compares, for computation, the satellite signals received by the GNSS antenna 50A (a mobile station) and the signal of the reference-station GNSS antenna 80 acquired from the correction data, to thereby compute the relative position (the direction and the distance) between the reference-station GNSS antenna 80 and the GNSS antenna 50A. On this occasion, carrier wave phase information on the satellite signals from the satellites received by the base-station antenna 80 is transmitted as the correction information, and is compared, for computation, with carrier wave phase information on the satellite signals received by the mobile-station antenna 50A by the GNSS receiver 51. As a result, the positioning of the mobile-station antenna 50A on an order of some centimeters is achieved, and hence, highly precise relative positioning with convergence to substantially a single point is achieved. Further, the absolute position of the GNSS antenna 50A which is the mobile station can be obtained by position information on the reference-station GNSS antenna 80 being included in the correction data described above. Moreover, when the distance between the reference-station GNSS antenna 80 and the GNSS antenna 50A is a near distance (generally within some kilometers), the error factors (the speed change in the electromagnetic wave and the clock information errors among the GNSS satellites) described above can appropriately be canceled out. The azimuth between the two GNSS antennas 50A and 50B and the position of the other GNSS antenna 50B can similarly be computed. The GNSS receiver 51 can output positioning results of the GNSS antennas 50A and 50B in the NMEA format including the latitudes, the longitudes, and the geoid heights of the GNSS antennas 50A and 50B, respectively.

Incidentally, the two GNSS antennas 50A and 50B are present as the positioning target of the GNSS receiver 51 in the present embodiment, and hence it is possible to set the one GNSS antenna 50A as a reference station and to deem the other GNSS antenna 50B as a mobile station. This method is the moving base method. The relative position (the vector) between the two GNSS antennas 50A and 50B can be measured by use of correction data generated from the reception signals of the GNSS antenna 50A for measurement of the relative position (the vector) with respect to the GNSS antenna 50B. In the moving base method, the relative position (the vector) can be computed without the correction data transmitted from the wireless device 87 being used.

Moreover, as another direction computation method, there is a method of computing each of the positions of the GNSS antenna 50A and the GNSS antenna 50B from the reference-station GNSS antenna 80, and obtaining the direction from a difference between these positions. Further, the orientation (the direction) of the upper swing structure 2 (the machine body) and the front work device 6 can be computed by a constant associated with the attached positions of the two GNSS antennas 50A and 50B on the excavator 1 being reflected to the direction between the two GNSS antennas 50A and 50B computed as described above.

Further, the description is given of the system in which the correction data is wirelessly transmitted from the reference-station GNSS antenna 80 to compute the direction of the upper swing structure 3 and the front work device 6 in the present embodiment, but there may be used a service of delivering a correction data on the VRS (virtual reference point method), the quasi-zenith satellite, or the like via a network. Needless to say, when the measurement precision is within a permissible range, the positioning of the GNSS antennas 50A and 50B may be carried out without the correction data from the reference station 8 or the like being used.

<Controller 40>

FIG. 2 is a functional block diagram of the controller 40 mounted to the hydraulic excavator 1 of FIG. 1.

The controller 40 is a computer which computes position coordinates of each of the front members 6A, 6B, and 6C forming the front work device 6, on the basis of the positions of the two GNSS antennas 50A and 50B and the azimuth (the heading) of the swing structure 3 computed by the GNSS receiver 51 and the sensing signals of the plurality of posture sensors 75A, 75B, 75C, and 23.

The controller 40 is provided with a computation processing device (for example, a CPU (not illustrated)), a storage device (for example, semiconductor memories such as a ROM and a RAM) 56, and an interface (an input/output device (not illustrated)), and executes, in the computation processing device, programs (software) stored in advance in the storage device 56, the computation processing device carries out the computation processing on the basis of data defined in the programs and data input from the interface, and the controller 40 outputs signals (computation results) from the interface to the outside. Note that, the GNSS receivers 51 and 81 can also be provided with hardware of the same type as that of the controller 40. Moreover, the storage device 56 may be a device independent of the controller 40.

The controller 40 is connected to the GNSS receiver 51, the posture sensors 75A, 75B, 75C, and 23, the monitor 60, and the wireless device 7 via the interface and can input and output data.

In the storage device 56 of the controller 40, there are stored, for example, construction target surface data 55 defining a position of the construction target surface which is a construction target of the hydraulic excavator 1, machine body shape/dimension data, various programs to be executed by the computation processing device, and the like.

The controller 40 executes the programs stored in the storage device 56, to function as a work device position/posture computation section 41, a positioning result input section 42, a satellite position extraction section 43, an excluded satellite determination section 44, a mask range computation section 45, a precision computation section 46, and a mask selection section 47.

<Positioning Result Input Section 42>

The positioning result input section 42 inputs the position data on the two GNSS antennas 50A and 50B in the geographic coordinate system computed by the GNSS receiver 51 and the azimuth data between the two GNSS antennas 50A and 50B (the heading data on the upper swing structure 3).

<Mask Range Computation Section 45>

The mask range computation section 45 computes a plurality of mask ranges to be used to select the positioning satellites used for the computation (the positioning) of the positions of the two GNSS antennas 50A and 50B by the GNSS receiver 51. The plurality of mask ranges computed by the mask range computation section 45 are stored in the storage device 56 in the controller 40. The mask range computation section 45 computes (sets) the plurality of mask ranges with reference to each of the two GNSS antennas 50A and 50B. The computed mask ranges here include a plurality of mask ranges (for example, a plurality of mask ranges different in size), and may include a mask range which changes on the basis of the postures of the front work device 6 and the upper swing structure 3 at the time of the computing (in other words, at the time of sensing of the postures by the posture sensors 75A to 75C and 23). A description is now mainly given of the computing and the setting of the mask ranges for the GNSS antenna 50A, but the computing and the setting of the mask ranges are also similarly carried out for the GNSS antenna 50B.

<First Mask Range 21A and Second Mask Range 22A>

The mask range of the GNSS antenna 50A includes a first mask range 21A set to a range in which the front work device 6 possibly constitutes an obstacle when the GNSS antenna 50A receives the satellite signals and a second mask range 22A set to a range included in the first mask range 21A.

The first mask range 21A may be set, on the basis of the attachment position of the GNSS antenna 50A in the upper swing structure 3, the posture of the upper swing structure 3 sensed via the swing structure posture sensor 23, and the maximum movable range of the front work device 6, to the maximum range in which the front work device possibly constitutes an obstacle when the GNSS antenna 50A receives the satellite signals.

The second mask range 22A may be set, on the basis of the attachment position of the GNSS antenna 50A in the upper swing structure 3, the posture of the upper swing structure 3 sensed via the swing structure posture sensor 23, and the posture of the front work device 6 sensed via the posture sensors 75A to 75C, to a range in which the front work device 6 at the time of the posture computing (at the time of the posture sensing) of the front work device 6 constitutes an obstacle when the GNSS antenna 50A receives the satellite signals.

In the present embodiment, the first mask range 21A and the second mask range 22A are set on, for example, the geographic coordinate system with use of a coordinate system with reference to the GNSS antenna 50A. Note that, the coordinate system with reference to the GNSS antenna 50A is sometimes referred to as a first antenna coordinate system, and similarly, a coordinate system with reference to the GNSS antenna 50B is sometimes referred to as a second antenna coordinate system. Moreover, the coordinate system on which the first mask range 21A and the second mask range 22A are set is not limited to the geographic coordinate system, and may be set on, for example, a site coordinate system having the origin on a work site.

A description is now given of the definition of the first antenna coordinate system.

Figure 3A:
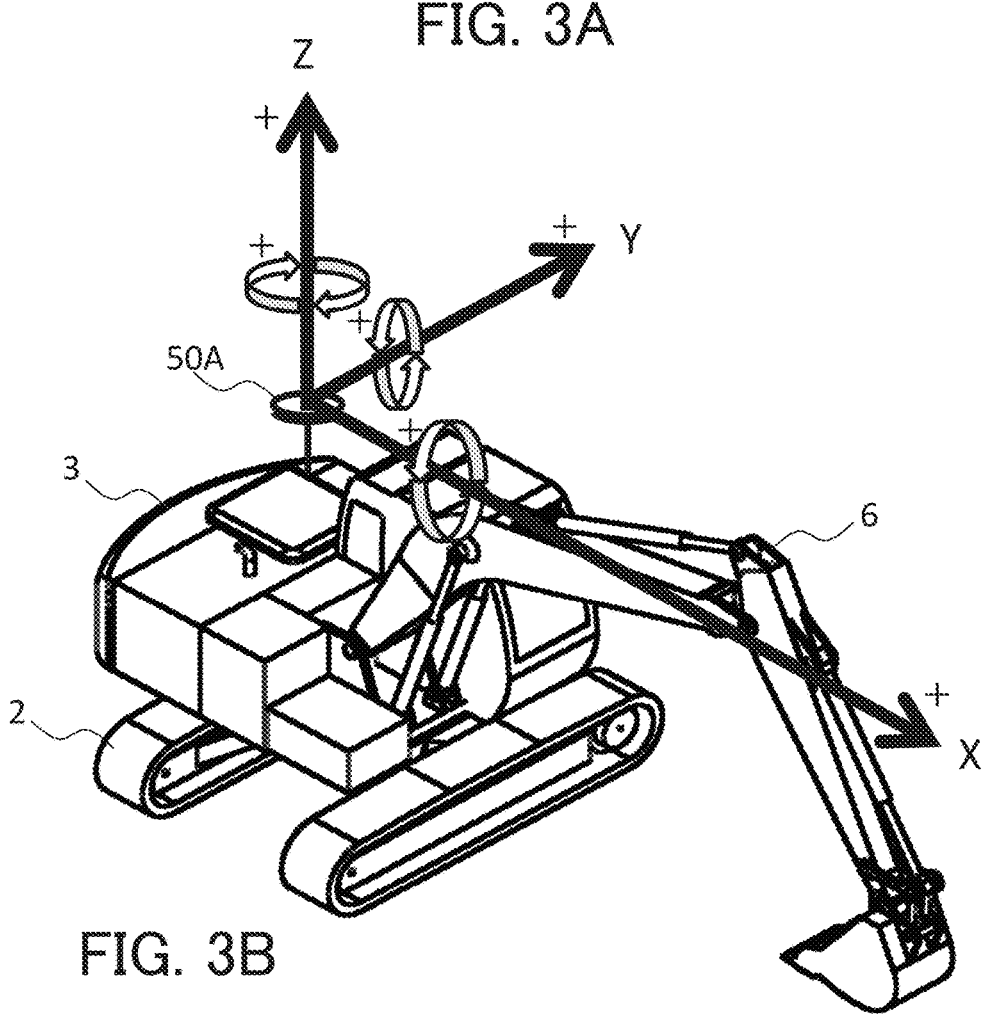
FIG. 3A is a perspective view of a first antenna coordinate system with reference to a GNSS antenna 50A.
Figure 3B:
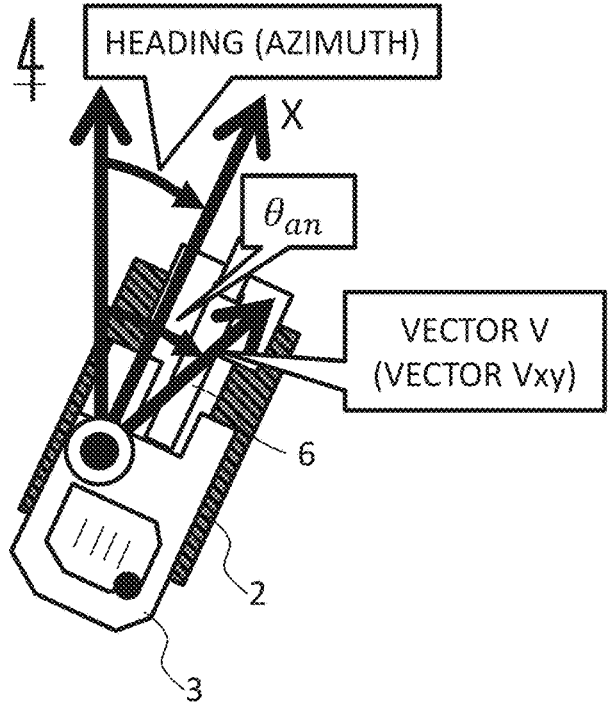
FIG. 3B is a view (a plan view) of the hydraulic excavator 1 as viewed from top along a Z-axis in the first antenna coordinate system.
Figure 3C:
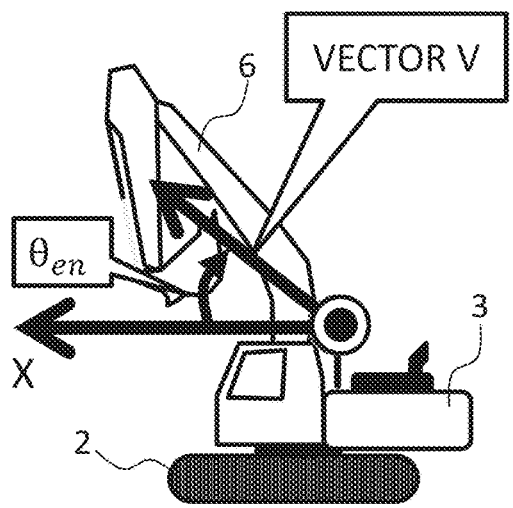
FIG. 3C is a view (a side view) of the hydraulic excavator 1 as viewed from a +Y axis direction in the first antenna coordinate system.

FIG. 3 depicts views for illustrating the first antenna coordinate system with reference to the GNSS antenna 50A. FIG. 3A is a perspective view of the first antenna coordinate system. FIG. 3B is a view in which the hydraulic excavator 1 is viewed from top along the Z-axis in the first antenna coordinate system. FIG. 3C is a view (a side view) in which the hydraulic excavator 1 is viewed from a +Y axis direction in the first antenna coordinate system.

As illustrated in FIG. 3A, the first antenna coordinate system is a coordinate system having the origin at the center of the GNSS antenna 50A mounted to the swing structure 3 and is fixed to the GNSS antenna 50A, that is, the swing structure 3. An X-axis of the first antenna coordinate system is a straight line extending along a front-rear direction of the swing structure 3, and the front direction of the swing structure 3 is the plus direction. The Y-axis is a straight line extending in a left-right direction of the swing structure 3, and the left direction of the swing structure 3 is the plus direction. The Z-axis is orthogonal to the X axis and the Y-axis, and an upper direction of the swing structure 3 is the plus direction thereof. Plus directions of rotation angles (the roll angle, the pitch angle, and the yaw angle (the heading)) about the respective coordinate axes X, Y, and Z are illustrated in this view.

The heading illustrated in FIG. 3B is the direction (the azimuth) toward which the swing structure 3 and the front work device 6 are directed, and is represented by an angle formed between a line obtained by orthogonally projecting the X-axis of the first antenna coordinate system on the horizontal plane and the true north. In the present embodiment, the direction of the true north is defined as 0 degrees, and the clockwise direction is positive when the X-axis is viewed from top vertically. As a result, the heading is defined between 0 degrees and 360 degrees. That is, the heading matches the azimuth computed by the GNSS receiver 51.

Coordinate values in the geographic coordinate system are formed of a latitude, a longitude, and an ellipsoidal height, and the coordinate values in the plane rectangular coordinate system, the geocentric rectangular coordinate system, and the site coordinate system are coordinate values in a three-dimensional rectangular coordinate system formed of X-, Y-, and Z-coordinates or the like. The geographic-coordinate-system coordinate values can be transformed into the coordinate values in a three-dimensional rectangular coordinate system such as the plane rectangular coordinate system by use of the Gauss-Krueger isometric projection or the like. Moreover, the plane rectangular coordinate system, the geocentric rectangular coordinate system, and the site coordinate system can mutually be transformed to each other by use of the affine transformation, the helmert transformation, and the like.

Figure 4:
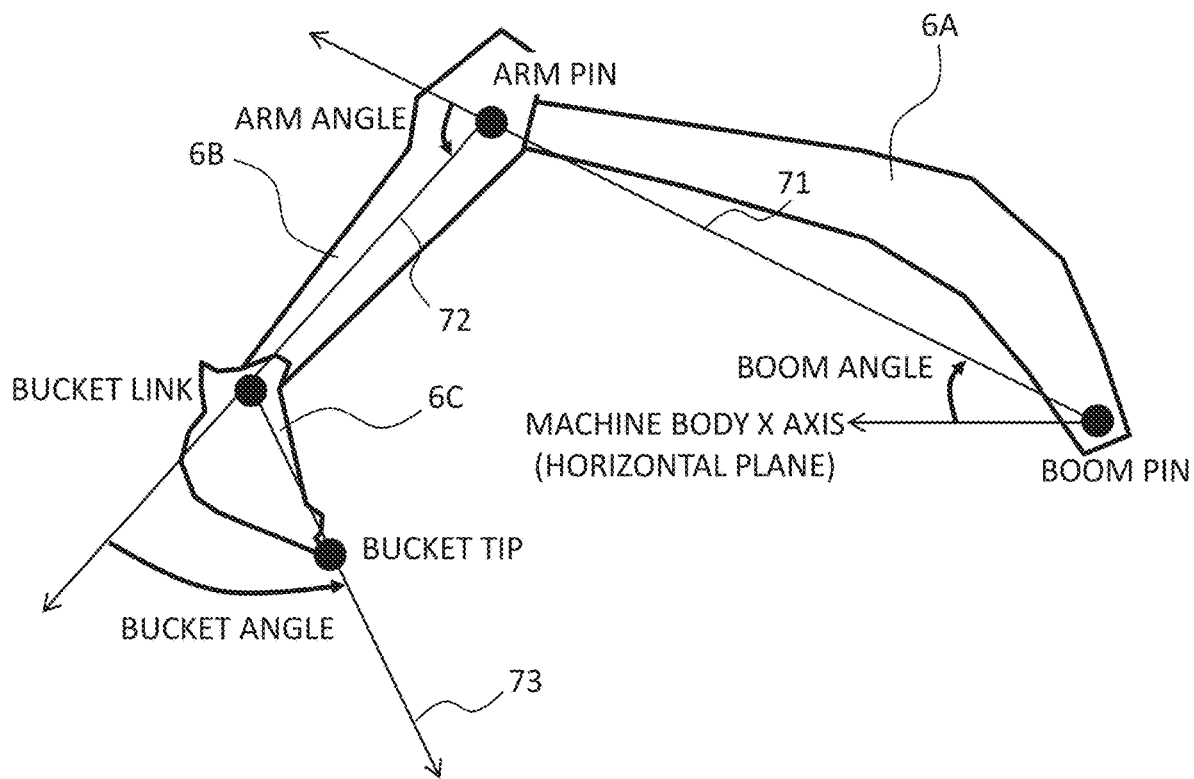
FIG. 4 is an explanatory view of angles defining a posture of a front work device 6.

With reference to FIG. 4, a description is now given of angles (a boom angle, an arm angle, and a bucket angle) which are angles defining the posture of the front work device 6 and are sensed by the posture sensors 75A to 75C. In this view, the boom angle is an angle of rotation of a straight line 71 passing through the center of a boom pin which is a rotation shaft of the boom 6A and the center of an arm pin which is a rotation shaft of the arm 6B with reference to a straight line extending horizontally from the center of the boom pin (a machine-body X-axis (same as the X-axis of FIG. 3A)). The arm angle is an angle of rotation of a straight line 72 passing through the center of the arm pin and the center of a bucket pin which is a rotation shaft of the bucket 6C with reference to the straight line 71. The bucket angle is an angle of rotation of a straight line 73 passing through the center of the bucket pin and the bucket tip with reference to the straight line 72. The boom angle, the arm angle, and the bucket angle are sensed by the boom posture sensor 75A, the arm posture sensor 75B, and the bucket posture sensor 75C, respectively.

The mask range computation section 45 computes the boom angle, the arm angle, and the bucket angle on the basis of the sensing signals of the boom posture sensor 75A, the arm posture sensor 75B, and the bucket posture sensor 75C. Next, the mask range computation section 45 uses the computed three angles to apply as appropriate a rotational movement and a translational movement to a three-dimensional model of the front work device 6 stored in the storage device 56, to thereby match the posture of this three-dimensional model to the posture of the actual front work device 6. Moreover, the mask range computation section 45 computes the roll angle and the pitch angle, which are the inclination angles of the swing structure 3, on the basis of the sensing signal of the swing structure posture sensor 23, applies values of the computed roll angle and pitch angle and the value of the heading (the azimuth of the swing structure 3) computed by the GNSS receiver 51 to the three-dimensional model of the front work device 6 in the same posture as the actual posture, to thereby rotate the three-dimensional model of the work device 6. In this state, the coordinates of the center of the GNSS antenna 50A in the geographic coordinate system are set to (X0, Y0, Z0), and coordinates of a desired point Pn on the front work device 6 are similarly set to (Xn, Yn, Zn). Note that, n is a natural number, and the maximum value thereof is the number of vertices defining the three-dimensional model of the front work device 6. A vector V from the center of the GNSS antenna 50A to the desired point Pn on the front work device 6 can be represented by Expression 1 in this configuration. Note that, X'n=Xn−X0, Y'n=Yn−Y0, and Z'n=Zn−Z0. The coordinates (X'n, Y'n, Z'n) representing the vector V are coordinates on the first antenna coordinate system.

$$\text{Vector } V = (X_n - X_0, Y_n - Y_0, Z_n - Z_0) \quad \text{[Expression 1]}$$
$$= (X'_n, Y'_n, Z'_n)$$

A vector Vxy obtained by projecting this vector V on an XY plane in the first antenna coordinate system can be represented by Expression 2.

$$\text{Vector } V_{xy} = (X'_n, Y'_n, 0) \quad \text{[Expression 2]}$$

When an angle from the north direction to the vector Vxy on the XY plane is represented as an azimuth angle θan (see FIG. 3B), this angle is represented by Expression 3, by use of the coordinate values X'n and Y'n on the first antenna coordinate system and the heading (the heading angle). Note that, a computing expression of the azimuth angle θan is divided into five cases in Expression 3 according to a combination of X'n and Y'n.

[Expression 3]

$$\theta_{an} = \begin{cases} \tan^{-1}\left(\frac{Y'_n}{X'_n}\right) & \text{if } X'_n > 0 \text{ and } Y'_n \geq 0 \\ \tan^{-1}\left(\frac{Y'_n}{X'_n}\right) + 2\pi & \text{if } X'_n > 0 \text{ and } Y'_n < 0 \\ \tan^{-1}\left(\frac{Y'_n}{X'_n}\right) + \pi & \text{if } X'_n < 0 \\ \frac{\pi}{2} & \text{if } X'_n = 0 \text{ and } Y'_n > 0 \\ \frac{3\pi}{2} & \text{if } X'_n = 0 \text{ and } Y'_n < 0 \end{cases} + \text{heading angle} \quad (3)$$

When an angle formed between the vector Vxy and the vector V is represented as an elevation angle θen (see FIG. 3C), this angle can be calculated as given by Expression 4, by use of the coordinate values X'n, Y'n, and Z'n on the first antenna coordinate system. Note that, a computing expression of the elevation angle θen is divided into five cases according to a combination of X'n, Y'n, and Z'n in Expression 4.

[Expression 4]

$$\theta_{en} = \begin{cases} \tan^{-1}\left(\frac{Z'_n}{\sqrt{X'^2_n + Y'^2_n}}\right) & \text{if } \sqrt{X'^2_n + Y'^2_n} > 0 \text{ and } Z'_n \geq 0 \\ \tan^{-1}\left(\frac{Z'_n}{\sqrt{X'^2_n + Y'^2_n}}\right) + 2\pi & \text{if } \sqrt{X'^2_n + Y'^2_n} > 0 \text{ and } Z'_n < 0 \\ \tan^{-1}\left(\frac{Z'_n}{\sqrt{X'^2_n + Y'^2_n}}\right) + \pi & \text{if } \sqrt{X'^2_n + Y'^2_n} < 0 \\ \frac{\pi}{2} & \text{if } \sqrt{X'^2_n + Y'^2_n} = 0 \text{ and } Z'_n > 0 \\ \frac{3\pi}{2} & \text{if } \sqrt{X'^2_n + Y'^2_n} > 0 \text{ and } Z'_n < 0 \end{cases} \quad (4)$$

The azimuth angle θan and the elevation angle θen can be computed from the coordinate values of the point Pn on the front work device 6 in the first antenna coordinate system as given by Expressions 3 and 4. Dimensions of the front work device 6 (the boom 6A, the arm 6B, and the bucket 6C) are known (for example, stored as the machine body shape/dimension data (described specifically later) in advance in the storage device 56), and hence, when the posture (the boom angle, the arm angle, and the bucket angle) of the front work device 6 is identified by the posture sensors 75A to 75C, the azimuth angle θan and the elevation angle θen relating to the desired point Pn on the front work device 6 in this posture can be computed.

The mask range is defined by a combination of a range of the azimuth angle θan and a range of the elevation angle θen in the present embodiment. That is, the mask range in the present embodiment is defined by the four parameters which are two azimuth angles θan and two elevation angles θen.

FIG. 5 depicts diagrams for illustrating an example of the first mask range 21A and the second mask range 22A set for the GNSS antenna 50A on a sky plot (a satellite arrangement diagram). In FIG. 5, the sky with reference to the GNSS antenna 50A is represented by two-dimensional coordinates having, as parameters, two of the azimuth angle and the elevation angle, and dots are added to the mask ranges to represent the mask ranges in grey. The center of a circle represents the center of the GNSS antenna 50A, a circumferential direction of this circle represents the azimuth angle, and a radial direction of this circle represents the elevation angle. Each of a plurality of circles including the alphabet G or R and a number in two digits in the diagram represents a position of the positioning satellite captured by the GNSS receiver 51, and the alphabet G or R and the number in two digits represent a number (a satellite number) of each positioning satellite.

Figure 5A:
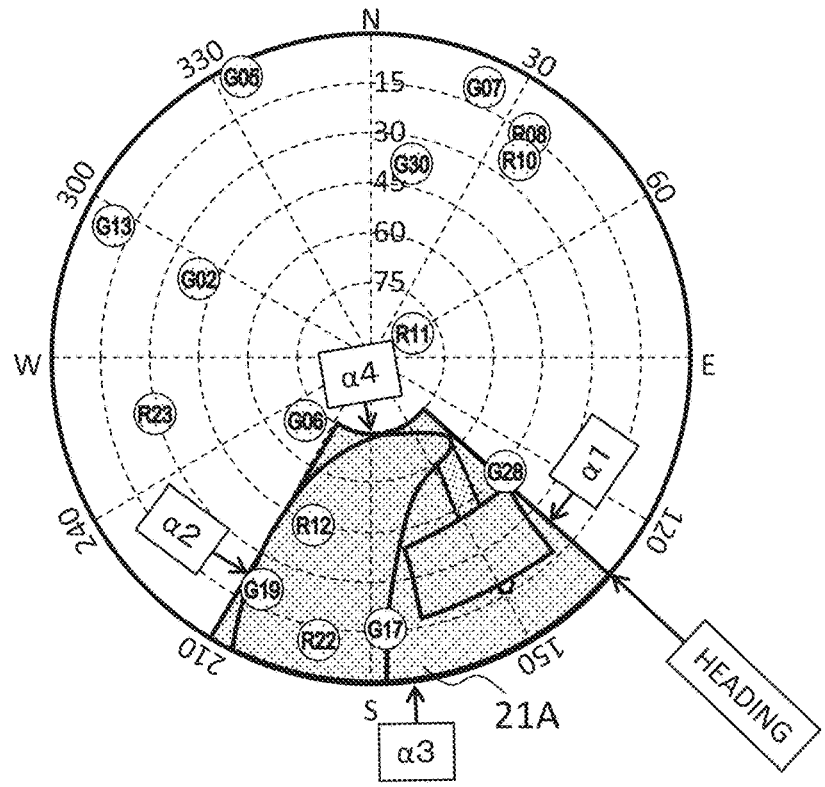
FIG. 5A is a diagram in which an example of a first mask range 21A set for the GNSS antenna 50A is illustrated on a satellite arrangement diagram.

An example of the first mask range 21A is illustrated in FIG. 5A. The first mask range 21A in this diagram is set to a range in which the azimuth angle is equal to or larger than α1 but equal to or smaller than α2 (note that, α2>α1) and a range in which the elevation angle is equal to or larger than α3 but equal to or smaller than α4 (note that, α4>α3). α1, α2, α3, and α4 are determined on the basis of the maximum movable range of the front work device 6. α1 is the minimum value which the azimuth angle θan can take when the swing structure 3 operates the front work device 6 in the maximum movable range, and α2 is the maximum value which the azimuth angle θan can take under the same condition. Similarly, α3 is the minimum value which the elevation angle θen can take under the same condition, and α4 is the maximum value which the elevation angle θen can take under the same condition. For example, in the case of FIG. 5A, α1=130, α2=210, α3=0, and α4=75. The first mask range 21A and the four parameters defining it are fixed unless the hydraulic excavator 1 (the swing structure 3) carries out the swing operation and the travel operation.

Figure 5B:
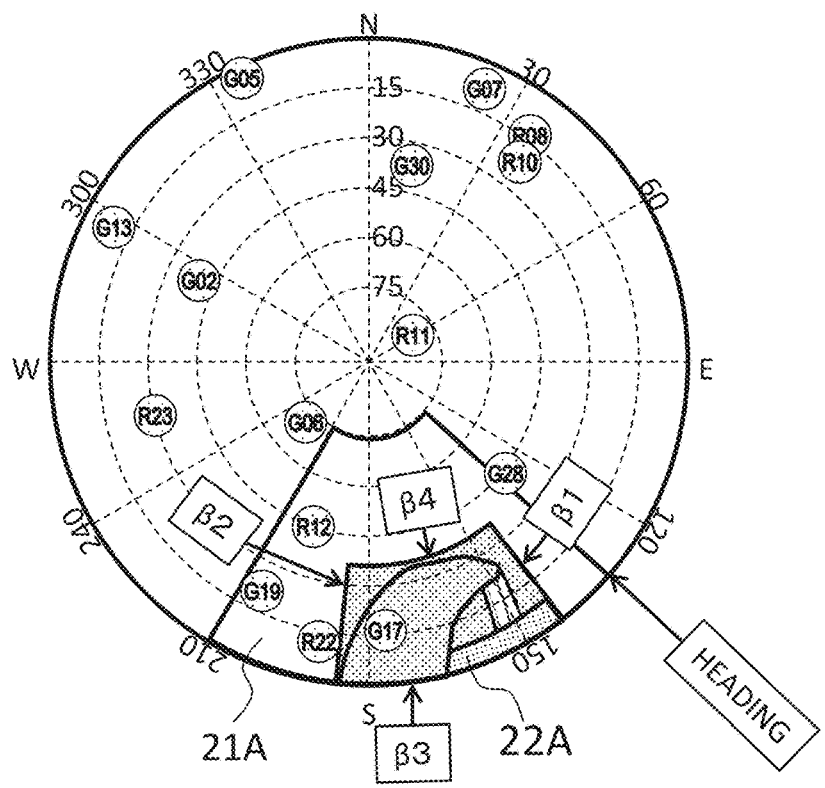
FIG. 5B is a diagram in which an example of a second mask range 22A set for the GNSS antenna 50A is illustrated on the satellite arrangement diagram.

An example of the second mask range 22A is illustrated in FIG. 5B. The second mask range 22A in this diagram is set to a range in which the azimuth angle is equal to or larger than β1 but equal to or smaller than β2 (note that, β2>β1) and a range in which the elevation angle is equal to or larger than β3 but equal to or smaller than β4 (note that, β4>αβ). β1, β2, β3, and β4 are determined on the basis of a range in which the posture of the front work device 6 covers the sky of the GNSS antenna 50A at a time t at which the postures (the boom angle, the arm angle, the bucket angle, the pitch angle, the roll angle, and the heading) of the front work device 6 and the swing structure 3 are computed.

Specifically, when the second mask range 22A is to be computed, the mask range computation section 45 obtains a combination of the azimuth angle θan and the elevation angle θen for each of all of the vertices Pn on the three-dimensional model of the front work device 6 at the certain time t at which Expressions 3 and 4 are used to compute the postures (the boom angle, the arm angle, the bucket angle, the pitch angle, the roll angle, and the heading) of the front work device 6 and the swing structure 3. In this state, the combinations of the azimuth angle θan and the elevation angle θen at the time t are represented as (θa1(t), θe1(t)), (θa2(t), θe2(t)), (θa3(t), θe3(t)), . . . , (θan(t), θen(t)). The mask range computation section 45 selects the largest azimuth angle θa_max(t), the largest elevation angle θe_max (t), the smallest azimuth angle θa_min(t), and the smallest elevation angle θe_min(t) from the obtained combinations. The second mask range 22A is also defined by the four parameters (β1, β2, β3, β4) as the first mask range 21A, and the four parameters are set such that β1=θa_min(t), β2=θa_max(t), β3=θe_min(t), and β4=θe_max(t). For example, in the case of FIG. 5B, β1=147, β2=185, β3=0, and β4=38. The second mask range 22A and the four parameters defining it are computed, for example, each time the posture of the front work device 6 is changed. The second mask range 22A is, by its nature, smaller than the first mask range 21A, and is included in the first mask range 21A (see FIG. 5B).

Note that, the heading and α1 can be expressed by the same value in the case of FIG. 5A, but the heading and β1 are different from each other in the case of FIG. 5B. Accordingly, the heading is not always θa_min(t).

The mask ranges 21A and 22A generated as described above are generated with reference to the position of the GNSS antenna 50A mounted to the swing structure 3 and hence move along with the GNSS antenna 50A also when the position of the GNSS antenna 50A is changed on the geographic coordinate system by the swing structure 3 being caused to carry out the travel operation or the swing operation. That is, the mask ranges 21A and 22A are not fixed with reference to the geographic coordinate system, and are fixed to the first antenna coordinate system illustrated in FIG. 3A.

Note that, the mask range is defined by the four parameters in the present embodiment, but, for example, a contour of the front work device 6A covering the sky of the GNSS antenna 50A when the front work device 6A is operated within the maximum movable range may be set for a contour of the first mask range 21.

<Precision Computation Section 46>

The precision computation section 46 is a section which computes (estimates) a positioning precision of the GNSS receiver 51 in each of a plurality of cases including a case in which the positioning satellites are selected by use of each of the plurality of mask ranges (for example, the first mask range 21A and the second mask range 22A) computed by the mask range computation section 45 and a case in which the positioning satellites are selected by use of none of these mask ranges (a case in which the satellite selection based on the mask ranges is interrupted). The number N of "the plurality of cases" in this state is available for each of the GNSS antennas 50A and 50B and corresponds to a numerical value obtained by 1 being added (that is, the case in which the mask ranges are not used) to the total number of mask ranges set for each of the GNSS antennas 50A and 50B. That is, when the two mask ranges are set for the GNSS antenna 50A, N is three. Note that, the numerical value of N for the GNSS antenna 50B may be different from the numerical value of N for the GNSS antenna 50A. N is sometimes referred to as the number of selection patterns of the mask range.

The positioning precision of the GNSS receiver 51 is a precision of the result of positioning of each of the GNSS antennas 50A and 50B by the GNSS receiver 51 and is hereinafter sometimes simply referred to as a "positioning precision." This positioning precision can be computed from data relating to the positioning satellites selectable after each mask range is used (the number and the arrangement of the positioning satellites available for the positioning (for example, the PDOP (Position Dilution of Precision)) and the SN ratios and the levels of the satellite signals received from the positioning satellites available for the positioning (hereinafter, these are sometimes referred to as "satellite related data")). The positioning precision can be computed on the basis of at least one of the pieces of satellite related data mentioned above, but it is preferred that the satellite related data used to compute the positioning precision be the same in all of the N cases. Note that, when N is three as mentioned above, the number of positioning precisions computed by the precision computation section 46 is also three.

In general, the positioning precision increases as the number of satellites increases, the value of the PDOP decreases, and the SN ratio and the level of the satellite signal increase. It is assumed, in the present embodiment, that an index value (a positioning precision index value) representing the positioning precision is computed from the satellite related data with this fact taken into consideration, and the precision is evaluated according to whether the index value is high or low. A description is hereinafter given based on an assumption that the precision is high as the positioning precision index value is larger. Note that, the satellite related data may be received from the GNSS receiver 51 or may be computed by the controller 40 on the basis of the satellite signals received by the GNSS antennas 50A and 50B. When the satellite related data is received from the GNSS receiver 51, a list of satellites to be excluded when the satellites are used to compute the satellite related data (an excluded satellite list mentioned later) may be transmitted from the controller 40.

Information on the satellites being captured by the GNSS receiver 51 is input from the satellite position extraction section 43 to the precision computation section 46. The precision computation section 46 acquires the satellite related data on satellites selectable after a certain mask range (it is assumed that the "mask range" mentioned here includes the case in which the mask is not used) among the plurality of mask ranges set for each GNSS antenna 50 is used, from information on remaining satellites obtained by the satellites included in this certain mask range being excluded from the plurality of satellites input from the satellite position extraction section 43.

This point is now specifically described. In the example of FIGS. 5, the precision computation section 46 computes the positioning precisions in a case in which the first mask range 21A is used, in a case in which the second mask range 22A is used, and in the case in which none of the mask ranges are used.

That is, the positioning precision (a first positioning precision) in the case in which the first mask range 21A is used to select the positioning satellites (a first case) is computed by the precision computation section 46 on the basis of the satellite related data on satellites obtained by the satellites (G17, G19, R12, and R22) included in the first mask range 21A being excluded from all of the satellites on the sky plot captured by the GNSS receiver 51. The positioning precision (a second positioning precision) in the case in which the second mask range 22A is used to select the positioning satellites (a second case) is computed by the precision computation section 46 on the basis of the satellite related data on satellites obtained by the satellite (G17) included in the second mask range 22A being excluded from all of the satellites on the sky plot captured by the GNSS receiver 51. The positioning precision (a third positioning precision) in the case in which none of the mask ranges are used to select the positioning satellites (a third case) is computed by the precision computation section 46 on the basis of the satellite related data on all of the satellites on the sky plot captured by the GNSS receiver 51.

The positioning precisions in the N cases computed by the precision computation section 46 are output to the mask selection section 47.

(Mask Selection Section 47)

The mask selection section 47 selects a case having the highest positioning precision out of the positioning precisions in the N cases computed by the precision computation section 46. As the case having the highest positioning precision, not only one of the plurality of mask ranges set for each of the GNSS antennas 50A and 50B may be selected, but also the case in which the mask range is not to be used may be selected. Information on the mask range selected by the mask selection section 47 is output to the excluded satellite determination section 44.

(Satellite Position Extraction Section 43)

The satellite position extraction section 43 extracts positions (the elevation angles and the azimuth angles in the geographic coordinate system) of the plurality of satellites the satellite signals of which are being captured by the GNSS receiver 51, and outputs the positions to the excluded satellite determination section 44 and the precision computation section 46.

(Excluded Satellite Determination Section 44)

The excluded satellite determination section 44 determines the excluded satellites not to be used by the GNSS receiver 51 for the positioning computation, on the basis of the mask range selected by the mask selection section 47 and the positions (the elevation angles and the azimuth angles) of the positioning satellites captured by the GNSS receiver 51 and input from the satellite position extraction section 43. Specifically, the excluded satellite determination section 44 determines, as the excluded satellites, the satellites present in the mask range selected by the mask selection section 47 from the plurality of satellites extracted by the satellite position extraction section 43 and outputs the list of these excluded satellites to the GNSS receiver 51.

(GNSS Receiver 51)

The GNSS receiver 51 acquires a list of the excluded satellites output from the excluded satellite determination section 44 and computes the position of at least one GNSS antenna 50 and the azimuth between the two GNSS antennas 50A and 50B (the azimuth of the upper swing structure 3) in the geographic coordinate system on the basis of the satellite signals of the satellites obtained by the satellites included in the list being excluded from the plurality of positioning satellites the satellite signals of which can be captured at this time. As a result, the GNSS receiver 51 computes the position of at least one GNSS antenna 50 and the azimuth between the two GNSS antennas 50A and 50B in the geographic coordinate system on the basis of the satellite signals of the positioning satellites selected in the case of having the highest precision out of the N positioning precisions computed by the precision computation section 46. The computed position and azimuth are input to the positioning result input section 42.

Note that, as the position measurement result output from the GNSS receiver 51, there may be output coordinate values of one or more coordinate systems of the plane rectangular coordinate system, the geocentric rectangular coordinate system, and the site coordinate system in addition to the geographic coordinate system.

(Work Device Position/Posture Computation Section 41)

The work device position/posture computation section 41 computes a position and a posture of the work device 6 (for example, the tip position and the posture of the bucket 6C in the site coordinate system) on the basis of the positions of the GNSS antennas 50A and 50B and the azimuth of the upper swing structure 3 input from the positioning result input section 42, the angle value of each of the front members 6A, 6B, and 6C computed from the output of each of the plurality of the posture sensors (75A, 75B, 75C, and 23) and the inclination angles (the pitch angle and the roll angle) of the upper swing structure 3, and the machine body shape/dimension data stored in the storage device 56. As the machine body shape/dimension data used for the computation of the position and the posture of the work device 6, there are, for example, a length between the two pins located at both ends of the boom 6A (a boom inter-pin length LB (see FIG. 4)), a length between the two pins located at both ends of the arm 6B (an arm inter-pin length), a length between the tip of the bucket 6C and the bucket pin (a bucket tip length), a GNSS attachment offset azimuth angle obtained by defining a positional relation between the two GNSS antennas 50A and 50B on the upper swing structure 3 by an azimuth angle in a machine body coordinate system, the attachment positions of the two GNSS antennas 50A and 50B on the upper swing structure 3 in the machine body coordinate system (the antenna attachment positions), and the maximum movable ranges of the front work device 6 with reference to each of the two GNSS antennas 50A and 50B.

The monitor 60 can display a positional relation between the work device 6 and the construction target surface computed on the basis of the position and posture data on the work device 6 in the site coordinate system computed by the work device position/posture computation section 41 and the position data on the construction target surface in the site coordinate system stored in the storage device 56. With this display, the operator can easily recognize the position/posture of the work device 6 with respect to the construction target surface.

Note that, there may be carried out machine control of, on the basis of the position and posture data on the work device 6 in the site coordinate system computed by the work device position/posture computation section 41 and the position data on the construction target surface in the site coordinate system stored in the storage device 56, limiting, by the controller 40, the operation of the work device 6 (that is, the operations of the actuators 11A, 11B, and 11C which drive the front members 6A, 6B, and 6C such that the bucket tip does not exceed the construction target surface.

Moreover, the mask range computation section 45 described above uses the azimuth angle and the elevation angle to define the mask ranges, but may use only the azimuth angle to define the mask ranges.

With reference to FIG. 5, a description is now added for the mask ranges described before.

FIG. 5A illustrates a sky plot when the front work device 6, as an obstacle, covers most of the field of vision in the sky of the GNSS antenna 50A. In this case, the first mask range 21A and the second mask range 22A are the same range, and can together be represented as the first mask range 21A.

However, the boom 6A is lowered in a case of FIG. 5B compared with the case of FIG. 5A, and the range in which the front work device 6 screens, as the obstacle, the field of vision in the sky of the GNSS antenna 50A decreases compared with the case of FIG. 5A. In this case, the first mask range 21A and the second mask range 22A are different from each other, and the number of satellites selected when the mask range 21A is used and that selected when the mask range 22A is used are different from each other. When the first mask range 21A is applied to the positioning in the case of FIG. 5B, the total four satellites of the satellites R12, G19, R22, and R17 are excluded by this first mask range 21A from the satellites available for the positioning. However, when the second mask range 22A is applied to the positioning in the case of FIG. 5B, only the satellite G17 is excluded by this second mask range 22A from the satellites available for the positioning. Hence, the number of satellites available for the positioning increases by three from that in the case in which the first mask range 21A is used.

As described above, the precision computation section 46 extracts the satellite available for the positioning when each mask range is applied (note that, the case in which none of the mask ranges are used may be included) and computes the positioning precision at the time when each mask range is used on the basis of the satellite related data on the satellites obtained after the extraction. The mask selection section 47 compares the plurality of positioning precisions computed by the precision computation section 46 with one another and determines the mask range which provides the highest positioning precision, and the positioning of the GNSS antenna 50 is carried out by the GNSS receiver 51 through use of this mask range. The series of flow mentioned above is described with reference to a flowchart of FIG. 6.

<Flowchart of Positioning Processing>

Figure 6:
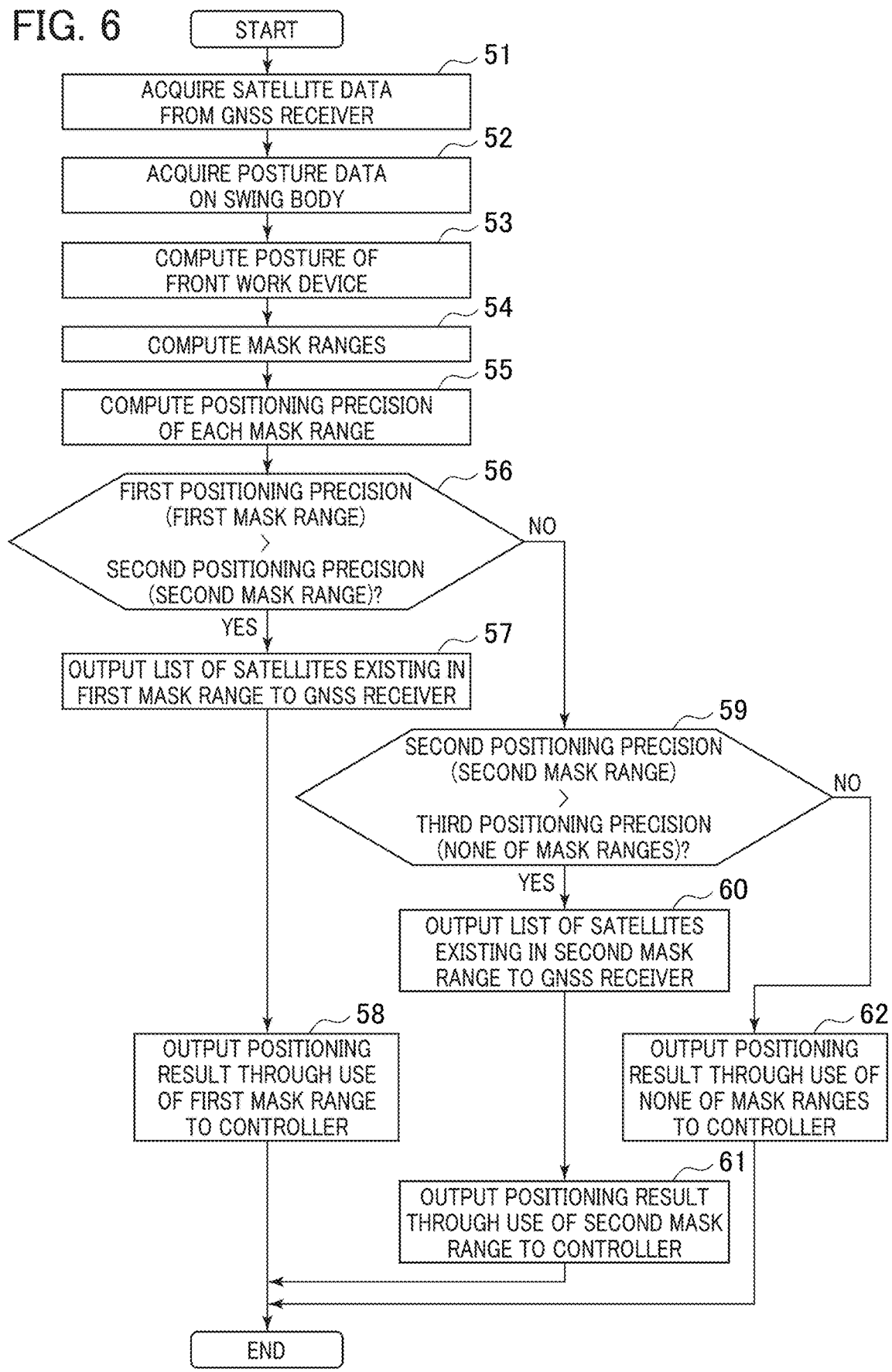
FIG. 6 is a flowchart of positioning processing for the GNSS antenna 50A by the controller 40 and a GNSS receiver 51 according to the present embodiment.

FIG. 6 is a flowchart of positioning processing of the GNSS antenna 50A by the controller 40 and the GNSS receiver 51 according to the present embodiment. This processing flow is repeatedly computed at intervals of a fixed time (for example, 100 ms). Note that, here, only the positioning of the GNSS antenna 50A is described, but it is assumed that equivalent processing is carried out also for the GNSS antenna 50B, and the azimuth between the two GNSS antennas 50A and 50B is computed on the basis of a positioning result of both of the GNSS antennas 50A and 50B.

The controller 40 (the satellite position extraction section 43) acquires, from the GNSS receiver 51, data (including the position data) on the plurality of satellites the satellite signals of which are being captured by the GNSS receiver 51, in step 51.

The controller 40 (the mask range computation section 45) computes the posture (the pitch angle and the roll angle) of the swing structure 3 on the basis of the sensing signal of the swing structure posture sensor 23, in step 52.

The controller 40 (the mask range computation section 45) computes the posture of the front work device 6 on the basis of the sensing signals of the three posture sensors 75A, 75B, and 75C, in step 53.

The controller 40 (the mask range computation section 45) computes, in step 54, the first mask range 21A on the basis of the posture of the swing structure 3 computed in step 52, the maximum movable range of the front work device 6 stored in the storage device 56, the position of the GNSS antenna 50A computed in the previous cycle and stored in the storage device 56, and the azimuth of the swing structure 3 computed in the previous cycle and stored in the storage device 56 (this azimuth (the heading) is computed on the basis of the azimuth between the two GNSS antennas 50A and 50B computed in the previous cycle and is stored in the storage device 56). Moreover, the controller 40 (the mask range computation section 45) computes the second mask range 22A included in the first mask range 21A, on the basis of the posture of the swing structure 3 computed in step 52, the posture of the front work device 6 computed in step 53, the position of the GNSS antenna 50A computed in the previous cycle, and the azimuth (the heading) of the swing structure 3 computed in the previous cycle.

The controller 40 (the precision computation section 46) computes, in step 55, the first positioning precision which is the positioning precision in the first case, on the basis of the satellite related data on the satellites captured in the first case in which the satellites present in the first mask range 21A are excluded and the remaining satellites are selected (the satellite related data is, for example, at least one of the number of satellites, the PDOP (the satellite arrangement), and the SN ratios of the satellite signals and can be acquired from the GNSS receiver 51 via the satellite position extraction section 43). The controller 40 similarly computes the second positioning precision which is the positioning precision in the second case, on the basis of the satellite related data (note that, it is assumed that the data of the same types as that used when the first positioning precision is computed is used) captured in the second case in which the satellites present in the second mask range 22A are excluded and the remaining satellites are selected, and computes the third positioning precision which is the positioning precision in the third case, on the basis of the satellite related data (note that, it is assumed that the data of the same types as that used when the first positioning precision is computed is used) in the third case in which none of the mask ranges are used to select the satellites.

The controller 40 (the mask selection section 47) compares, in step 56, the first positioning precision and the second positioning precision computed in step 55 with each other. The controller 40 proceeds to step 57 when the first positioning precision is higher than the second positioning precision in positioning precision and proceeds to step 59 when the first positioning precision is equal to or lower than the second positioning precision in positioning precision.

The controller 40 (the mask selection section 47) determines, as the excluded satellites, the satellites present in the first mask range 21A from among the plurality of satellites the positions of which are acquired in step 51 and outputs the list of these excluded satellites (the excluded satellite list) to the GNSS receiver 51 in step 57.

Figure 7:
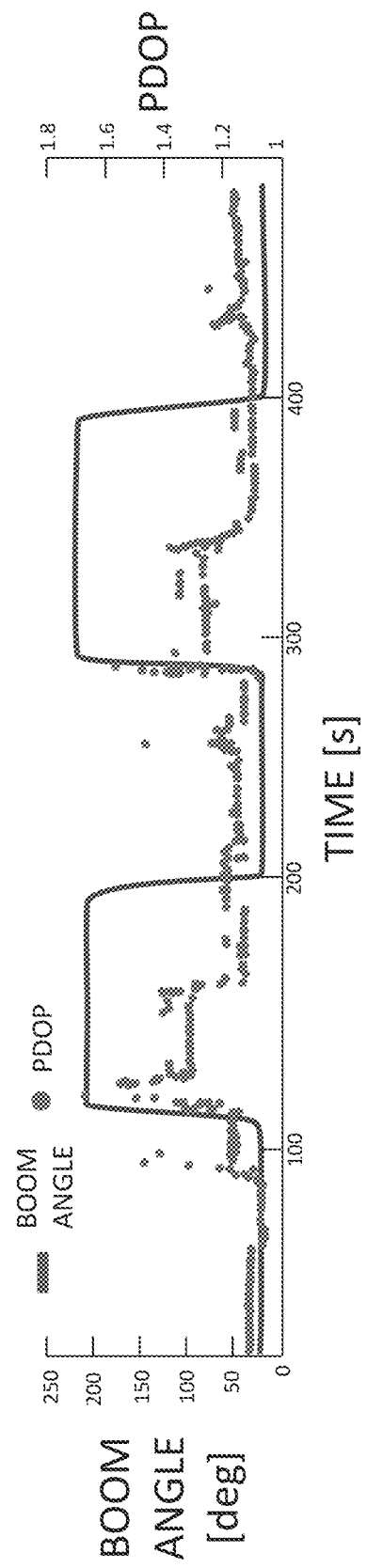
FIG. 7 is a chart for illustrating an example of temporal changes in an angle of a boom 6A (a boom angle) and the PDOP.

With reference to FIG. 7, a description is now given of a specific example of the case in which the first positioning precision is higher in positioning precision than the second positioning precision, that is, the positioning precision is higher when the first mask range 21A larger than the second mask range 22A is used. FIG. 7 is a chart for illustrating an example of temporal changes in the angle of the boom 6A (the boom angle) and the PDOP. There is a timing at which the boom angle increases in a short period of time twice in this chart, and, at this timing, a boom raising operation in the front work device 6 and the swing operation of the swing operation of the swing structure 3 are combined, to thereby carry out a dumping operation on a dump truck or the like. Meanwhile, there is a period in which the boom angle is held at an angle smaller than 50 degrees three times, and, at this timing, excavating by the front work device 6 is carried out. That is, FIG. 7 illustrates a state in which the excavation and the dumping (the swing operation) are repeated. When the use of the second mask range 22A is continued in the case in which the excavating and the swing operation are repeated as illustrated in this chart, the satellites screened due to the posture change of the boom 6A and the change in the swing angle (the azimuth of the swing structure 3) greatly change, and hence, the PDOP may increase, that is, the positioning precision may decrease, before and after the timing of the boom raising as illustrated in the chart. Accordingly, in this case, the positioning precision at the time when the first mask range 21A having the wider range is used to suppress the fluctuation of the mask range may be higher than that at the time when the second mask range 22A is used.

The GNSS receiver 51 excludes the satellites included in the excluded satellite list in step 57 from the satellites the data on which is transmitted to the controller 40 in step 51, computes the position of the GNSS antenna 50A on the basis of the satellite signals of the remaining satellites, and outputs the position, as the positioning result of the GNSS antenna 50A, to the controller 40 in step 58.

The controller 40 (the mask selection section 47) compares, in step 59, the second positioning precision and the third positioning precision computed in step 55 with each other. The controller 40 proceeds to step 60 when the second positioning precision is higher than the third positioning precision in positioning precision and proceeds to step 62 when the second positioning precision is equal to or lower than the third positioning precision in positioning precision.

The controller 40 (the mask selection section 47) determines, as the excluded satellites, the satellites present in the second mask range 22A from among the plurality of satellites the positions of which are acquired in step 51 and outputs the list of these excluded satellites (the excluded satellite list) to the GNSS receiver 51 in step 60.

The GNSS receiver 51 excludes the satellites included in the excluded satellite list in step 60 from the satellites the data on which is transmitted to the controller 40 in step 51, computes the position of the GNSS antenna 50A based on the satellite signals of the remaining satellites, and outputs the position, as the positioning result of the GNSS antenna 50A, to the controller 40 in step 61.

The GNSS receiver 51 computes the position of the GNSS antenna 50A based on the satellite signals of satellites the data on which is transmitted to the controller 40 in step 51 and outputs the position, as the positioning result of the GNSS antenna 50A, to the controller 40 in step 62.

Figure 8:
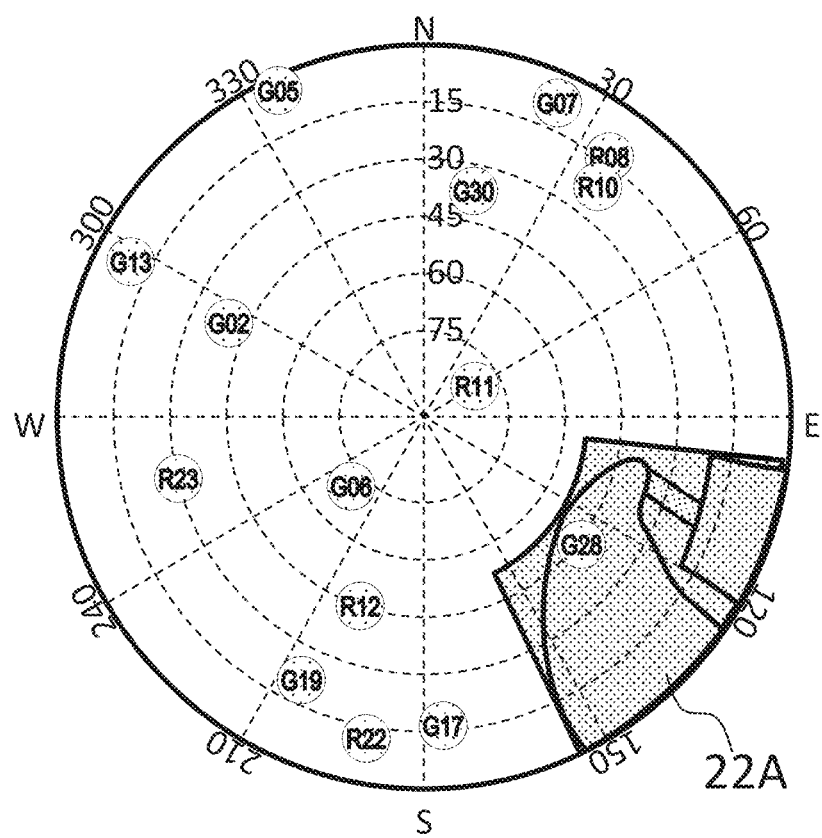
FIG. 8 is a diagram for illustrating a satellite arrangement and the second mask range 22A at a certain time.

With reference to FIG. 8, a description is now given of a specific example of the case in which the third positioning precision is higher than the second positioning precision in positioning precision, that is, the case in which using none of the mask ranges is higher in positioning precision than using the second mask range 22A (the case of proceeding to step 62). FIG. 8 is a diagram for illustrating the satellite arrangement and the second mask range 22A at a certain time. In the case of this diagram, the number of satellites present in the azimuth of the front work device 6 is only one (G28), and the number of satellites present in an azimuth opposite to the azimuth of the front work device (an azimuth obtained by adding 180 degrees) is also small. In this case, when the satellite G28 is excluded through use of the second mask range 22A, the number of satellites is insufficient, and hence, the positioning precision likely decreases. That is, the positioning precision decreases conversely when the second mask range 22A is used, and the positioning precision is higher when none of the mask ranges are used.

In the hydraulic excavator 1 configured as described above, the controller 40 computes, when the plurality of mask ranges are set, the positioning precision in the case in which each mask range is used, on the basis of the satellite related data in the case in which each mask range is used, and selects one mask range to be used for positioning of the GNSS antennas 50A and 50B from the plurality of mask ranges, on the basis of the computed positioning precision. As a result, the positioning precision possibly increases compared with the case in which the mask range is selected on the basis of the posture of the front work device 6.

In the flowchart of FIG. 6, the controller 40 computes the positioning precisions in each of the plurality of cases in which the plurality of mask ranges different in size are used (the case in which the mask range is not set is included), on the basis of the satellite related data in each case, and selects one mask range relating to the case having the highest positioning precision. That is, as a result of the satellite related data being takin into consideration for the selection of the mask range, the decrease in the positioning precision can be suppressed more than a case in which the mask range (the second mask range 22A in the embodiment) is changed in association with the posture of the front work device 6, and hence, a precision of the work by the hydraulic excavator 1 can consequently be increased.

In particular, there are included, as the candidates of the mask range, the first mask range 21A which covers the entire movable range of the front work device 6 and the second mask range 22A which covers the area hidden depending on the posture of the front work device 6 at that time, in the present embodiment. As a result, the posture of the front work device 6 is taken into consideration in selecting the mask range and computing the positioning precision, and the influence of the screening of the positioning signals by the front work device 6 can also be reduced.

<Others>

In the flow of FIG. 6, determination processing of comparing the first positioning precision and the third positioning precision with each other may further be added when it is determined that the first positioning precision is higher in precision than the second positioning precision in step 56. In this determination processing, the controller 40 may proceed to step 57 when the first positioning precision is determined to be higher in precision and may carry out the same processing as that in step 62 (that is, the processing of carrying out the positioning with use of none of the mask ranges) when the third positioning precision is determined to be higher in precision.

The case in which the two mask ranges 21A and 22A are used is described in the present embodiment, but the number of available mask ranges is not limited to any number as long as the mask ranges are different from one another. For example, a mask range larger than the first mask range may be set. Moreover, a mask range may be set in consideration of the operation range of the front work device in the same work among types of work (for example, the excavation, the transport, and the dumping) repeated by the hydraulic excavator, work to be carried out by the hydraulic excavator may then be estimated, and the mask range set for this work may be used. It is estimated that the mask range in the latter case is smaller than the first mask range 21A but larger than the second mask range 22A.

It is to be noted that the present invention is not limited to the embodiment mentioned above, and includes various modification examples within a scope not departing from the purport of the present invention. For example, the present invention is not limited to the configuration including all of the components described in the embodiment mentioned above, and includes a configuration obtained by the components partially being removed. Moreover, some of components in a certain embodiment may be added to or may replace components in another embodiment.

Moreover, a part of or the whole of each component relating to the controller 40, the functions and executed processing of each component, and the like may be implemented by hardware (for example, by designing a logic for carrying out each function through use of an integrated circuit). Moreover, the component relating to the controller 40 may be a program (software) which is read out and executed by a computation processing device (for example, a CPU), so that each function relating to the component of the controller 40 is implemented. Information on this program may be stored in, for example, a semiconductor memory (such as a flash memory and an SSD), a magnetic storage device (such as a hard disk drive), a recording medium (such a magnetic disk and an optical disc), and the like.

Moreover, in the description of each embodiment, control lines and information lines considered necessary for the description of the present embodiment are mentioned, but all of control lines and information lines relating to the product are not necessarily described. It can be considered that almost all of the components are actually connected to one another.

DESCRIPTION OF REFERENCE CHARACTERS

1: Hydraulic excavator
2: Track structure (lower track structure)
3: Swing structure (upper swing structure)
4: Operator's seat
6: Front work device
6A: Boom
6B: Arm
6C: Bucket
7: Wireless device
8: GNSS reference station
8: Reference station
11A: Boom cylinder
11B: Arm cylinder
11C: Bucket cylinder
21A: First mask range
22A: Second mask range
23: Swing structure posture sensor
40: Controller
41: Work device position/posture computation section
42: Positioning result input section
43: Satellite position extraction section
44: Excluded satellite determination section
45: Mask range computation section
46: Precision computation section
47: Mask selection section
50A: GNSS antenna (positioning antenna)
50B: GNSS antenna (positioning antenna)
51, 81: GNSS receiver
56: Storage device
60: Monitor
75A: Boom posture sensor
75B: Arm posture sensor
75C: Bucket posture sensor
80: Reference-station GNSS antenna
81: GNSS receiver
82: Reference-station controller
87: Wireless device

The invention claimed is:

1. A work machine comprising:
a lower track structure;
an upper swing structure that is mounted in a swingable manner on the lower track structure;
a work device of an articulated type that is mounted to the upper swing structure;
a plurality of posture sensors that sense postures of the work device and the upper swing structure;
a positioning antenna that is mounted to the upper swing structure and receives satellite signals from a plurality of positioning satellites;
a receiver that is configured to compute a position of the positioning antenna on a basis of the satellite signals received by the positioning antenna; and
a controller that is configured to compute the posture of the work device and the posture of the upper swing structure on a basis of sensing signals of the plurality of posture sensors, wherein
the controller stores a plurality of mask ranges set with reference to the positioning antenna on a basis of the postures of the work device and the upper swing structure, in order to select the positioning satellites to be used by the receiver to compute the position of the positioning antenna,
the controller is configured to compute, on a basis of satellite related data on the selected positioning satellites, a plurality of positioning precisions including each positioning precision at a time when each of the plurality of mask ranges is used to select the positioning satellites and a positioning precision at a time when none of the plurality of mask ranges are used to select the positioning satellites, and
the receiver is configured to compute the position of the positioning antenna on a basis of the satellite signals of the positioning satellites selected in a case of having a highest positioning precision out of the plurality of positioning precisions.

2. The work machine according to claim 1, wherein the plurality of mask ranges include
a first mask range set to a range in which the work device likely forms an obstacle when the positioning antenna receives the satellite signals, and
a second mask range set to a range included in the first mask range.

3. The work machine according to claim 2, wherein
the first mask range is set, on a basis of the computed posture of the upper swing structure and a maximum movable area of the work device, to a maximum range in which the work device likely forms the obstacle when the positioning antenna receives the satellite signals, and
the second mask range is set, on a basis of the computed posture of the upper swing structure and the computed posture of the work device, to a range in which the work device at a time when the posture of the work device is computed forms the obstacle when the positioning antenna receives the satellite signals from the plurality of positioning satellites.

4. The work machine according to claim 2, wherein
the controller is configured to
compute a first positioning precision being a positioning precising in a first case in which the first mask range is used, on a basis of the satellite related data in the first case,
compute a second positioning precision being a positioning precising in a second case in which the second mask range is used, on a basis of the satellite related data in the second case, and
compute a third positioning precision being a positioning precising in a third case in which none of the mask ranges are used, on a basis of the satellite related data in the third case, and
the receiver is configured to compute the position of the positioning antenna on a basis of the satellite signals of the positioning satellites selected in a case of having the highest positioning precision out of the first positioning precision, the second positioning precision, and the third positioning precision.

5. The work machine according to claim 2, wherein
the controller is configured to
compute a first positioning precision being a positioning precising in a first case in which the first mask range is used, on a basis of the satellite related data in the first case,
compute a second positioning precision being a positioning precising in a second case in which the second mask range is used, on a basis of the satellite related data in the second case, and
compute a third positioning precision being a positioning precising in a third case in which none of the mask ranges are used, on a basis of the satellite related data in the third case, and
the receiver is configured to compute the position of the positioning antenna on a basis of the satellite signals of the positioning satellites selected in a case in which the first mask range is used when the first positioning precision is higher than the second positioning precision in the positioning precision.

6. The work machine according to claim 5, wherein the receiver is configured to compute the position of the positioning antenna on a basis of the satellite signals of the positioning satellites selected in a case in which the second mask range is used, when the first positioning precision is equal to or lower than the second positioning precision in positioning precision and the second positioning precision is higher than the third positioning precision in positioning precision.

7. The work machine according to claim 6, wherein the receiver is configured to compute the position of the positioning antenna on a basis of the satellite signals of the positioning satellites selected with use of none of mask ranges, when the first positioning precision is equal to or lower than the second positioning precision in positioning precision and the second positioning precision is equal to or lower than the third positioning precision in positioning precision.

8. The work machine according to claim 1, wherein the satellite related data includes at least one of the number of positioning satellites available for positioning, an arrangement of the positioning satellites available for the positioning, and an SN ratio of the satellite signals of the positioning satellites available for the positioning.

9. The work machine according to claim 1, wherein
the positioning antenna is a first positioning antenna,
a second positioning antenna that is mounted to the upper swing structure and receives the satellite signals from the plurality of positioning satellites is further provided,
the receiver is configured to compute an azimuth between two positioning antennas being the first positioning antenna and the second positioning antenna, on a basis of the satellite signals received by the two positioning antennas,
the controller is configured to compute an azimuth of the upper swing structure on a basis of a position of the first positioning antenna and the azimuth between the two positioning antennas, and
the plurality of mask ranges are set on a basis of the postures of the work device and the upper swing structure and the azimuth of the upper swing structure.

* * * * *